United States Patent [19]

Kondolf, Jr.

[11] Patent Number: 5,174,689

[45] Date of Patent: Dec. 29, 1992

[54] PNEUMATIC TRANSPORT APPARATUS

[76] Inventor: Karl Q. Kondolf, Jr., 3902 Industry Blvd., Lakeland, Fla. 33803

[21] Appl. No.: 804,246

[22] Filed: Dec. 9, 1991

[51] Int. Cl.$^5$ ............................................. B65G 51/26
[52] U.S. Cl. .................... 406/112; 406/148; 406/176
[58] Field of Search ............... 406/112, 111, 147–149, 406/176, 179, 180, 13, 189

[56] References Cited

U.S. PATENT DOCUMENTS

| 4,436,456 | 3/1984 | Thomas | 406/112 X |
| 4,930,941 | 6/1990 | Willey et al. | 406/112 X |

Primary Examiner—Charles A. Marmor
Assistant Examiner—James M. Kannofsky
Attorney, Agent, or Firm—George A. Bode; D. Neil LaHaye

[57] ABSTRACT

A pneumatic transport apparatus. A main terminal and a remote terminal each have one end of a carrier tube connected thereto. A sub-carrier is slidably received in each terminal for vertical movement therein. Means are provided at each terminal for locking the sub-carrier in the upper portion of the terminal. A carrier for transporting items between the terminals is received within the sub-carriers and moved between terminals through the carrrier tube. Reversible motors are mounted on a housing at the main terminal that is in communication with the terminal for selectively creating pressure or suction therein to cause the carrier to move from one terminal to the other.

5 Claims, 8 Drawing Sheets

PNEUMATIC TRANSPORT APPARATUS

BACKGROUND OF THE INVENTION

1. Field of the Invention

The present invention is generally related to pneumatic transport systems and more particularly, to a single line pressure/vacuum system.

2. General Background

Pneumatic transport systems are typically used by banks and other commercial institutions for delivering and receiving materials encased in a container specifically designed to be compatible with the system. Systems which the inventor is familiar with include the following.

U.S. Pat. No. 4,436,456 to Thomas entitled "Pneumatic Communication System For Banking And The Like" discloses a pair of upright customer and teller terminals joined at right angles at their lower ends by a carrier transit tube. Each terminal includes a carrier elevator, a blower, and special ducting for using both blowers to raise the elevator and carrier at the receiving terminal. Air valves at each terminal influence the movement of the carrier.

U.S. Pat. No. 3,948,466 to Rudder, et al. entitled "Pneumatic Carrier Send And Receive Terminal" discloses a movable horizontal tray alignable with a horizontal pneumatic tube connected to a terminal. A carrier sealing ring on the end of the tray is aligned with the tube and surrounds the gasket of a received carrier. Cams are used to push the carrier out of the ring when the tray is moved out of the terminal and to engage and push the carrier in the ring when the carrier is replaced and the tray is retracted.

U.S. Pat. No. 4,941,777 to Kieronski entitled "Apparatus For Conveying Material" discloses a reversible blower system that conveys a carrier member through a tube by suction from one terminal to an intermediate location and by pneumatic pressure from the intermediate location to the other terminal, and vice-versa. The carrier member is gradually retarded and stopped at each terminal by a yieldable plate. A double tube arrangement is used to provide the combined suction and pressure.

U.S. Pat. No. 3,612,438 to Herndon entitled "Pneumatic Transport Apparatus" discloses a transport device wherein the carrier utilizes fins to stabilize it during its travel within a winding hollow rigid tube system.

U.S. Pat. No. 4,251,169 to Kelly, et al. entitled "Single Line Pneumatic Tube System" discloses a single-blind pneumatic tube system capable of incorporating one or more intermediate stations.

U.S. Pat. No. 4,820,086 also to Kieronski entitled "Pneumatic Tube Carrier System And Method" discloses a system that includes means for automatically removing the contents from the carrier at a terminal before returning the carrier to the other terminal.

U.S. Pat. No. 4,256,418 to Stangl entitled "Pneumatic Tube Station" discloses a displaceable tube portion that can be moved parallel to itself out of a continuous delivery tube. When inserted in the delivery tube, the displaceable portion is connected at both ends with the delivery tube.

U.S. Pat. No. 4,437,797 to Kardinal entitled "Pneumatic Mail Station For The Delivery, Pneumatically Decelerated Reception And Transit Of The Pneumatic Dispatch Cases" discloses a reception tube chamber closed at one end and a transit tube chamber open at both ends. First and second reception tube chambers that are connected provide pneumatic deceleration proportional to the kinetic energy of an incoming pneumatic dispatch case.

Although a variety of systems are known, all require motors at each end of the system, a plurality of tubes for providing suction and pressure, long radius bins to traverse corners or some special form of operator interaction at each end of the system for receiving and sealing the items to be transported in the carrier and then ensuring that the carrier is properly positioned for transportation through the system. This leaves a need for a system that can be operated from one end and that has all motors and controls at one end.

SUMMARY OF THE PRESENT INVENTION

The preferred embodiment of the apparatus of the present invention solves the aforementioned problems in a straightforward and simple manner. What is provided is a pneumatic transport apparatus that is particularly suitable to situations such as a mailbox at a home where the operator can retrieve the carrier and its contents from a remote station and return the carrier to the remote station from a single location. A pair of vertically oriented terminals are interconnected at their lower ends by a horizontal, straight carrier tube. Each terminal includes a sub-carrier that receives the main carrier in sealing engagement and a locking mechanism for locking the sub-carrier at the upper end of the terminal. This allows items to be inserted into or removed from the carrier. One terminal includes the single blower, all controls and motors for operating the system. The other terminal includes means for preventing items placed in the terminal when the carrier is not present from falling to the bottom of the terminal and into the carrier tube.

BRIEF DESCRIPTION OF THE DRAWING

For a further understanding of the nature and objects of the present invention, reference should be had to the following description taken in conjunction with the accompanying drawings in which like parts are given like reference numerals and, wherein.

DETAILED DESCRIPTION OF THE PREFERRED EMBODIMENT

Figure 1:
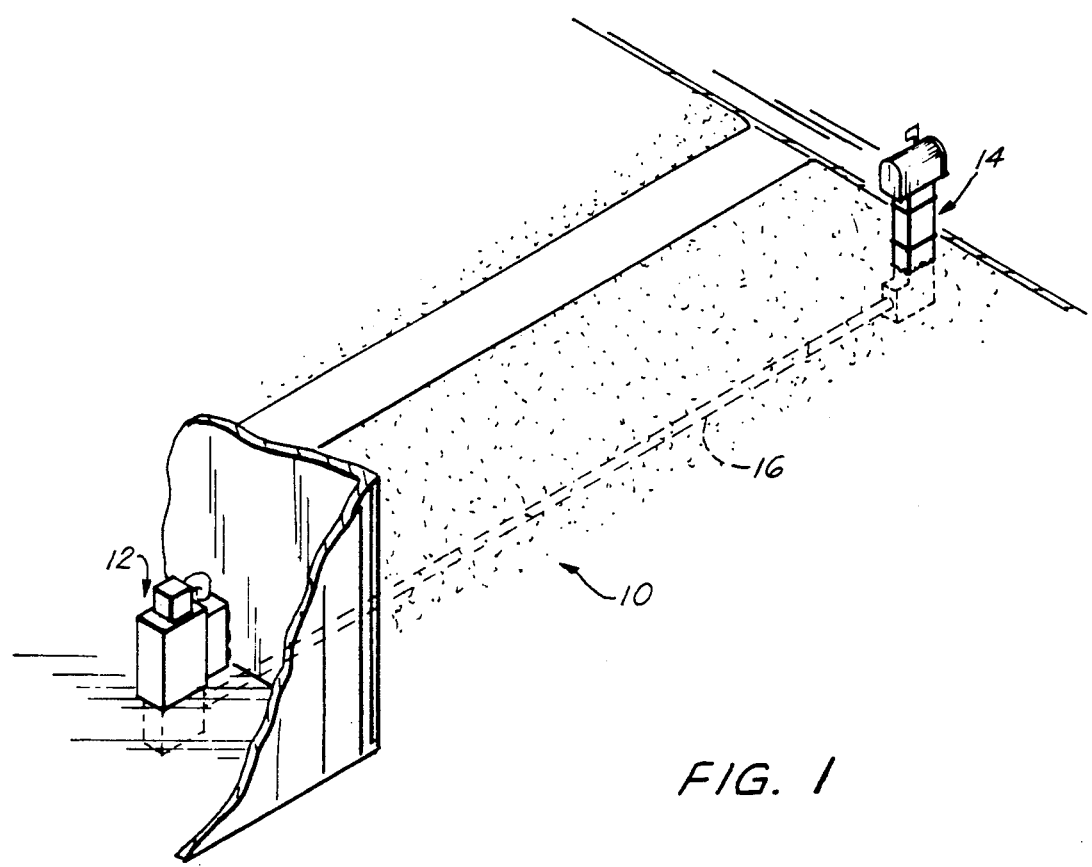
FIG. 1 is a schematic view of the preferred embodiment of the apparatus of the present invention.
Figure 5:
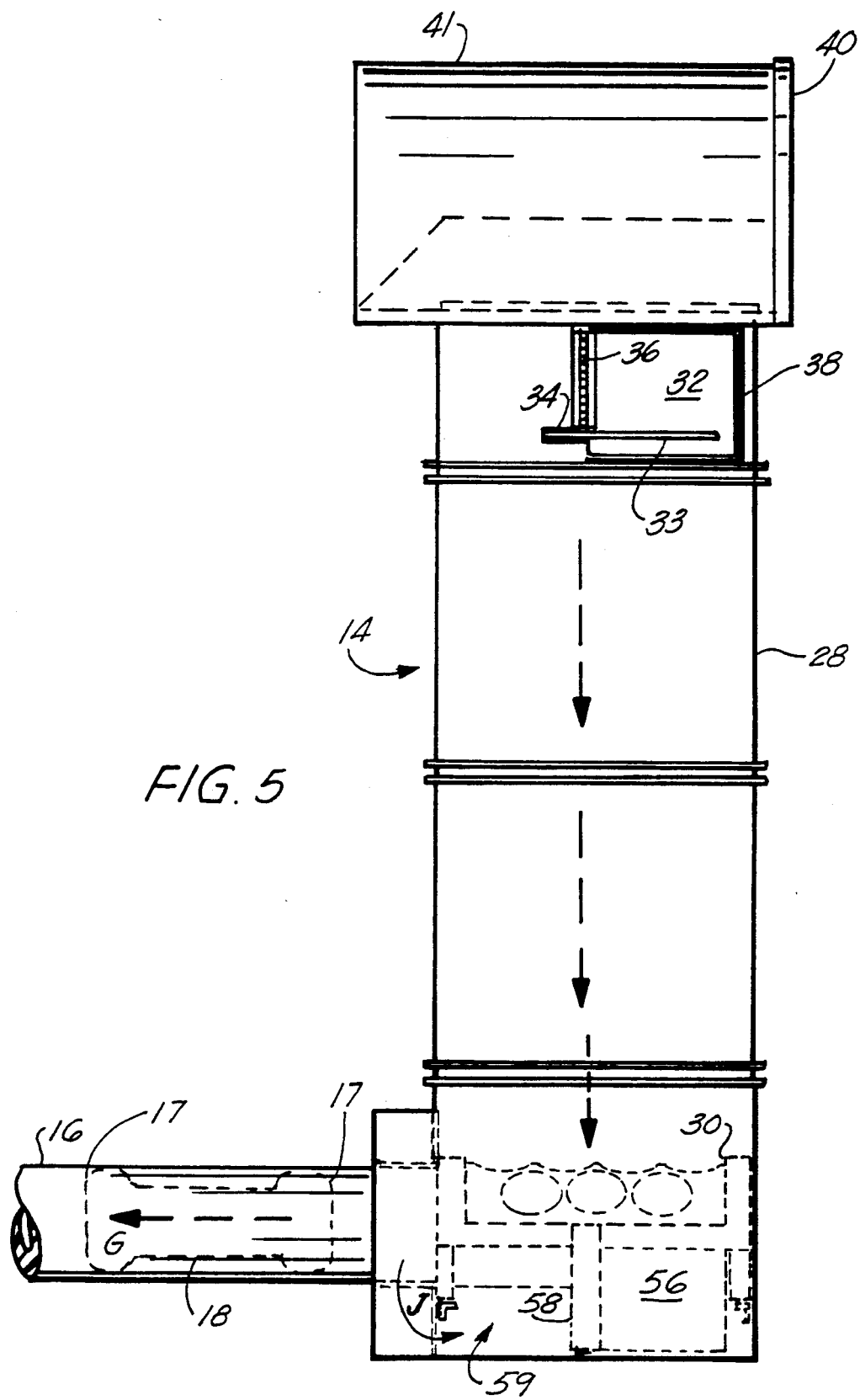
FIG. 5 is a view illustrating the carrier and sub-carrier (in phantom) at the bottom of the remote terminal.
Figures 9, 10:
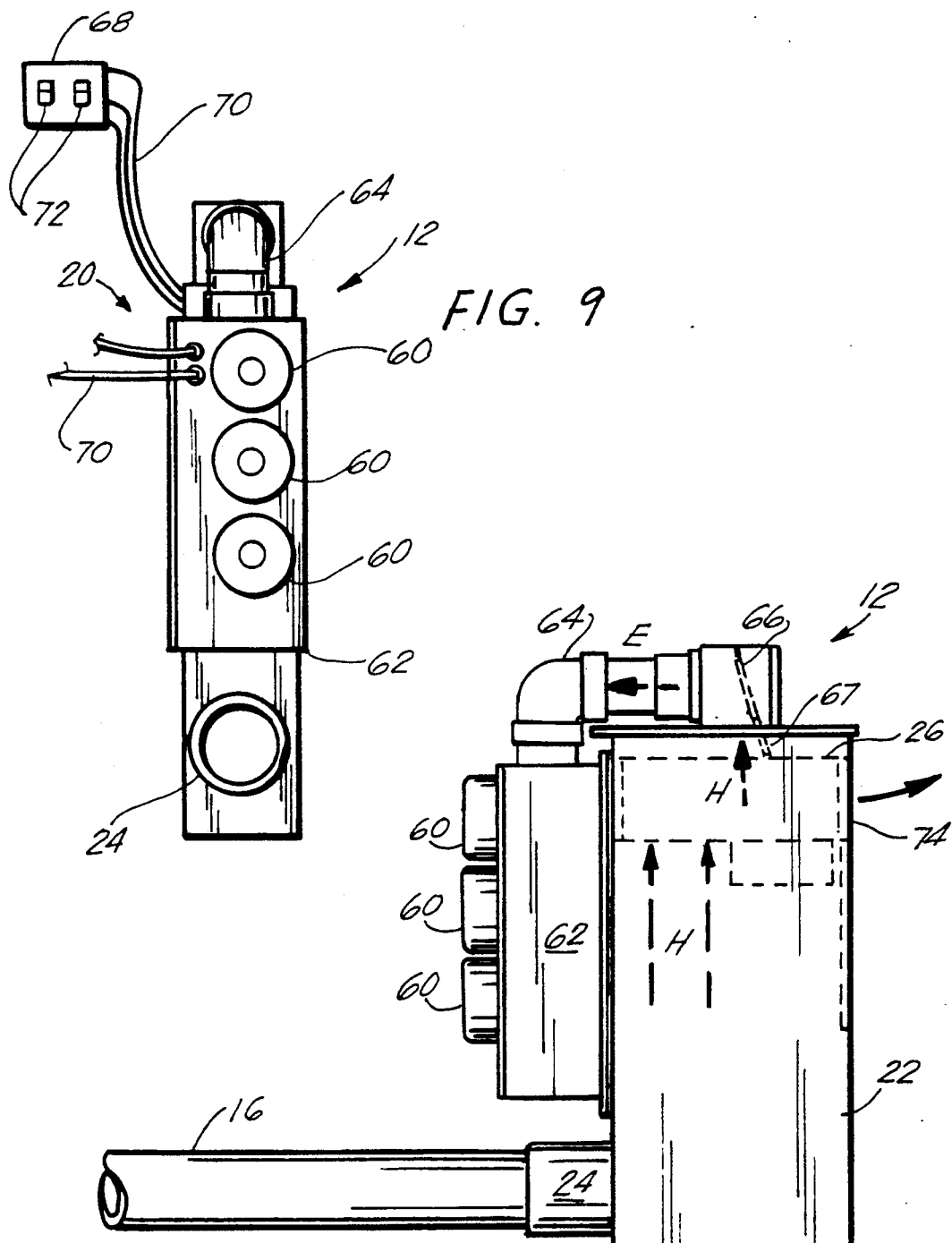
FIG. 9 is an end view (the end being that opposite FIG. 7) of the main terminal illustrating the motors and controls; and, FIG. 10 is a side view illustrating (in phantom) movement of the carrier to the upper end of the main terminal.

Referring now to the drawings, is it best seen in FIGS. 1, 5 and 9 that the invention is generally referred to by the numeral 10. Pneumatic transport apparatus 10 is generally comprised of main terminal 12 and remote terminal 14 connected by horizontal or straight carrier tube 16, carrier 18 and means 20 for causing carrier 18 to move between terminals 12, 14.

Referring to FIGS. 7-10, it is seen that main terminal 12 is an upright hollow enclosure 22 that is rectangular in cross-section. One side of enclosure 22 is adapted to have its interior in communication with carrier tube 16. Sleeve 24 is mounted on the side of housing or enclosure 22 in coaxial alignment with a bore therein that is the same size as the inner diameter of sleeve 24. Sleeve 24 is sized to tightly receive one end of carrier tube 16. Means 20 for causing carrier 18 to move between terminals 12, 14 is also mounted on enclosure 22. First, sub-carrier 26 is slidably received within enclosure 22 for vertical movement therein.

Figure 2:
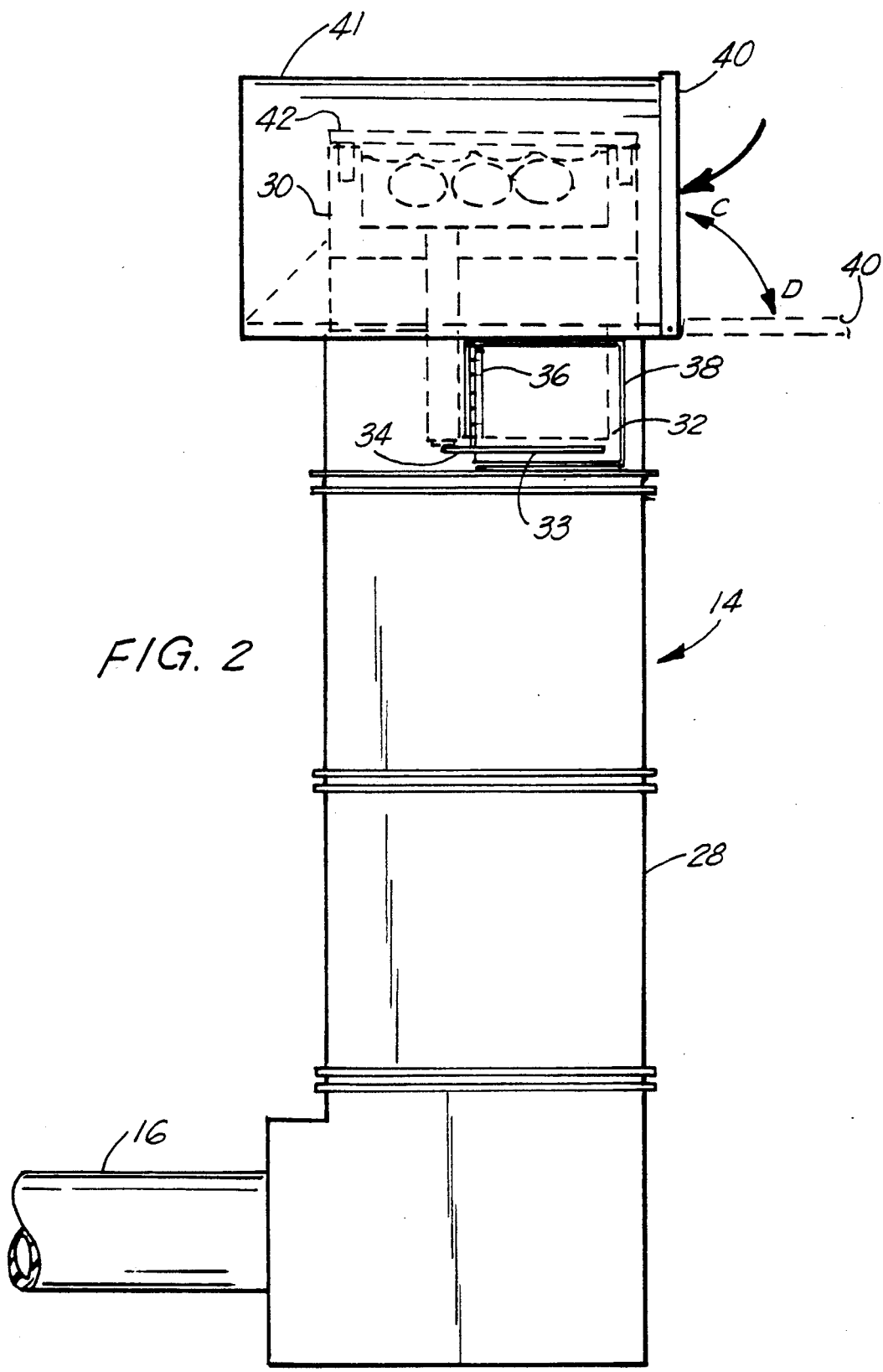
FIG. 2 is a side view (and partial phantom view) of the remote terminal.
Figure 3:
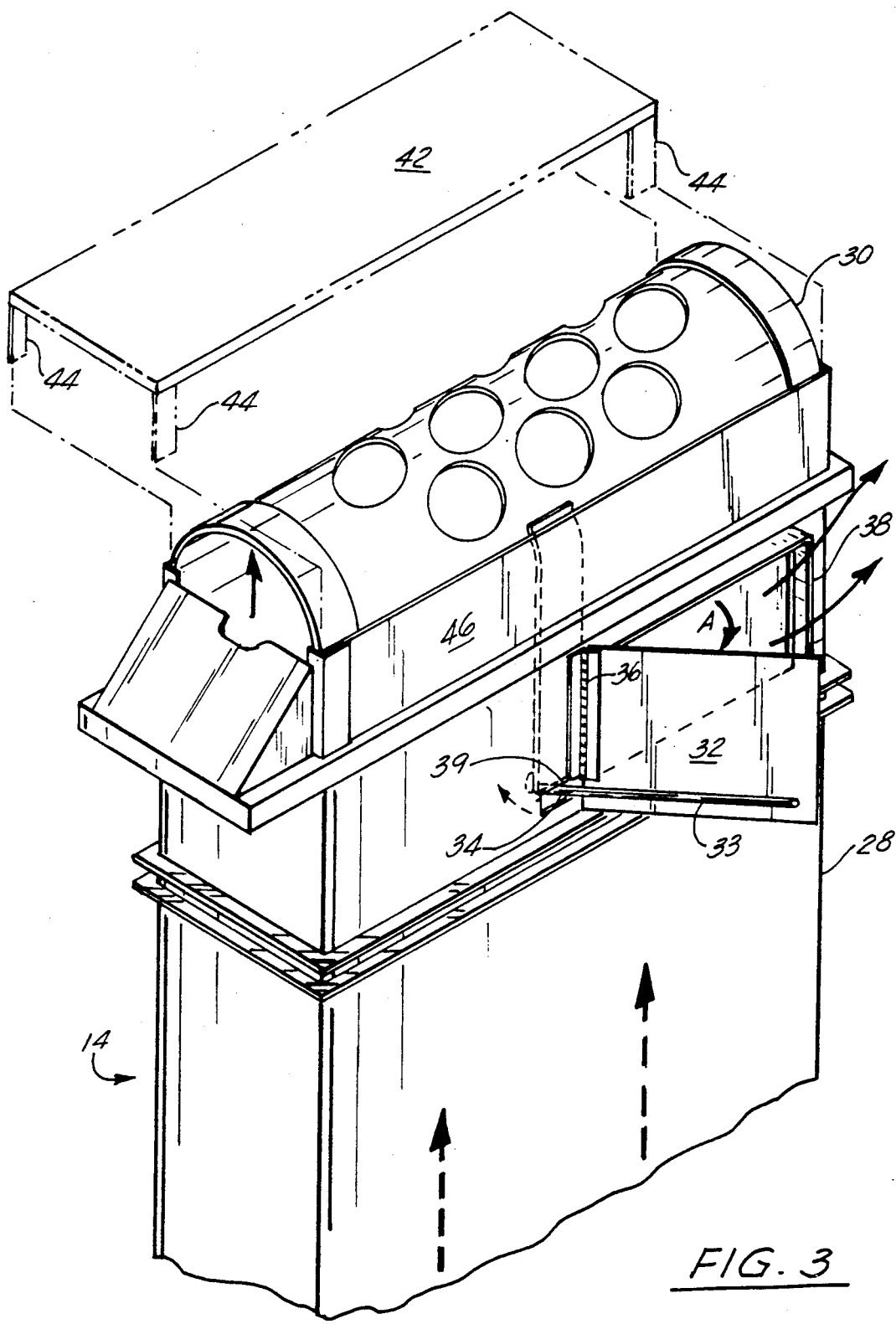
FIG. 3 is a perspective view, partially exploded, of details of the top of the remote terminal.
Figure 4:
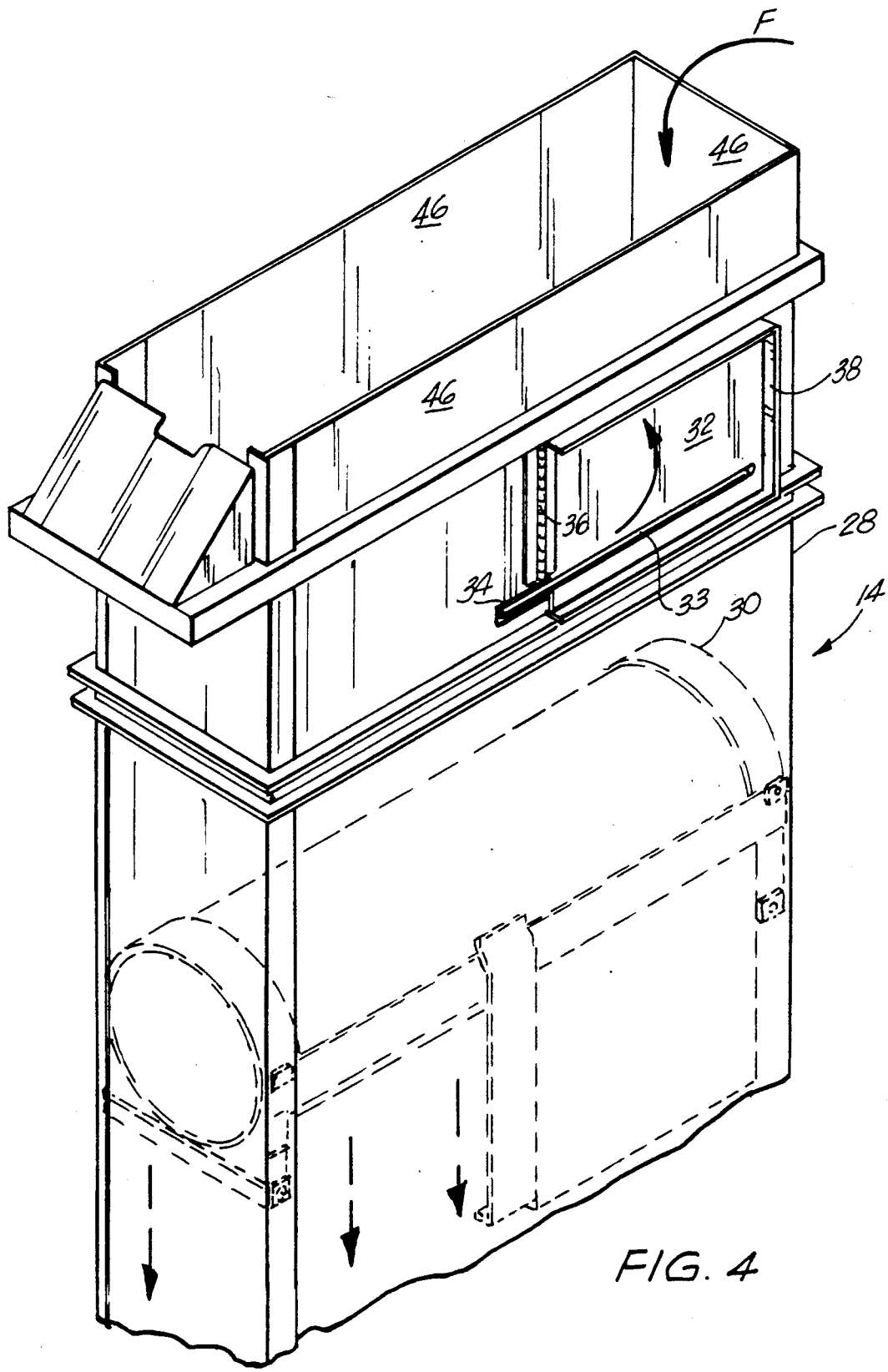
FIG. 4 is a view illustrating the operation of the sub-carrier (in phantom) descending in the remote terminal.

Remote terminal 14, best seen in FIGS. 2-5, is an upright hollow enclosure 28 that is rectangular in crosssection. Remote terminal 14 is also provided with a bore sized to tightly receive one end of carrier tube 16. This puts terminals 12, 14 in communication with each other via carrier tube 16. Second sub-carrier 30 is slidably received within upright enclosure 28 for vertical movement therein. As best seen in FIGS. 2-4, remote terminal 14 is provided with means for locking sub-carrier 30 in position at the upper end thereof in the form of door 32 and latching arm 34. Door 32 is formed from a flat plate that is hingedly mounted on the side of remote terminal 14 as indicated by hinge 36. Door 32 is hinged to coincide with rectangular cut-out 38 on remote terminal 14. Latching arm 34 may be formed from a horizontal rod 33 fixedly attached to door 32 that extends beyond hinge point 36. Positive air pressure inside remote terminal 14 forces door 32 to open in the direction of ARROWS A in FIG. 3. Latching arm 34 moves with door 32 and swings inside remote terminal 14 through an aperture 39 which is an extension of rectangular cut-out 38. In this position, as best seen in FIGS. 2 and 3, latching arm 34 is positioned underneath sub-carrier 30 and, therefore, supports sub-carrier 30 to prevent it from falling to the lower end of remote terminal 14 when positive air pressure is eliminated. FIGS. 2, 4, 5 illustrate door 32 in its closed position that allows movement, i.e., lowering or raising, of sub-carrier 30 inside remote terminal 14. FIG. 3 illustrates door 32 in its open position where latching arm 34 extends inside of remote terminal 14 through aperture 39 and supports sub-carrier 30. Door 32 is moved (ARROW B of FIG. 4) from its open position (FIG. 3) to its closed position (FIGS. 2, 4 and 5) automatically in response to negative pressure, or a suction, inside remote terminal 14.

As best seen in FIGS. 2 and 5, the preferred embodiment of the present invention utilizes the general shape of a mailbox for the top cover 41 of remote terminal 14. Door 40 is hinged to open (ARROW D) and close (ARROW C), as seen in FIG. 2, in the normal fashion of a mailbox to provide easy access for inserting items such as mail into carrier 18 inside sub-carrier 30. This is accomplished without removing carrier 18 from sub-carrier 30. Removable tray 42 is provided inside remote terminal 14 to prevent items that may be placed therein from falling to the bottom when sub-carrier 30 is at the bottom of remote terminal 14. As best seen in FIG. 3, tray 42 is formed from a flat piece of rectangular shaped material. Legs 44 extend down from adjacent each corner of tray 42 to stabilize it in position when resting on sub-carrier 30. Tray 42 is sized to be slightly wider than sub-carrier 30 such that the sides of tray 42 will rest on walls 46 when sub-carrier 30 is moving toward or at the lower end of remote terminal 14.

Figure 6A:
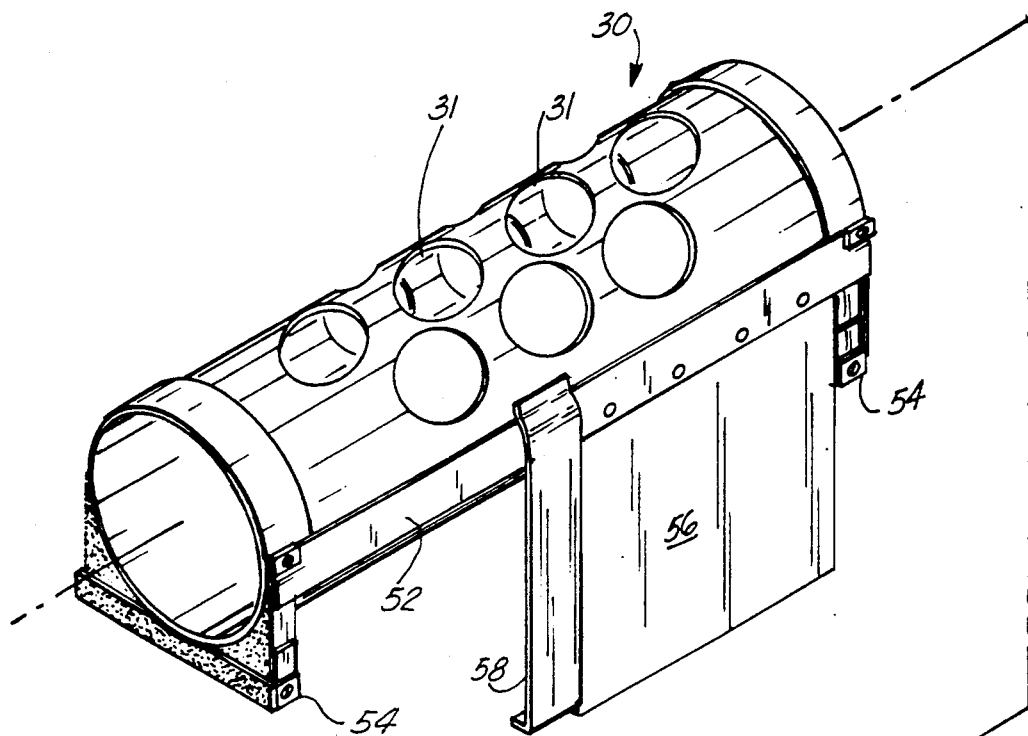
FIGS. 6A and 6B are top perspective views of the sub-carrier and carrier, respectively.
Figure 6B:
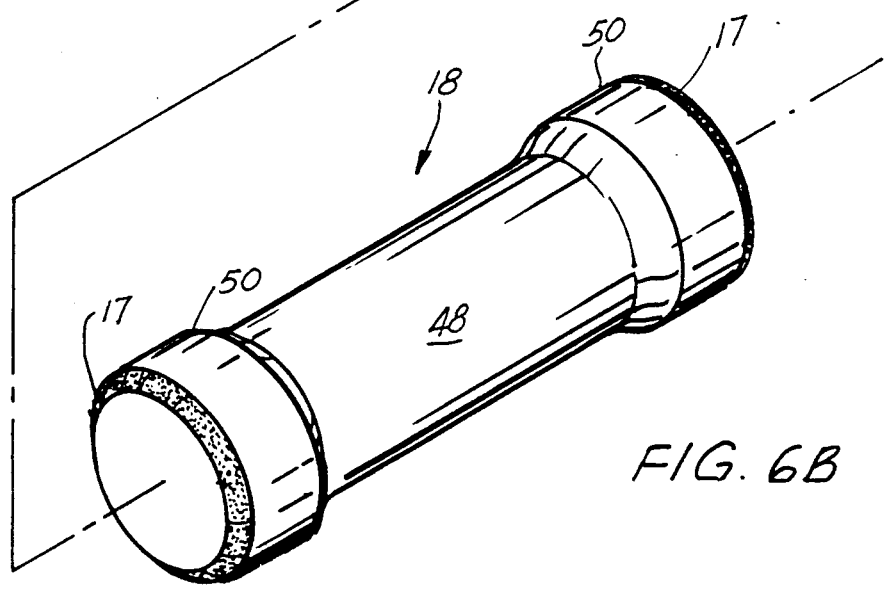
Figure 7:
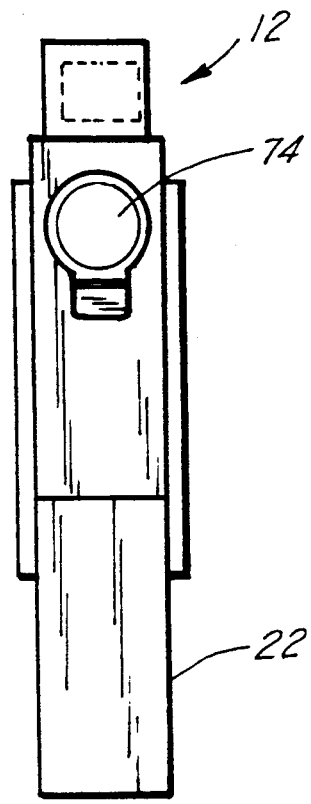
FIG. 7 is an end view of the main terminal.

Carrier 18, best seen in FIG. 6B, is a cylinder having one closed end and one open end (although both ends can be selectively openable by rotating a hinged cover such as is common in carriers of remote bank teller terminals). Main body portion 48 is provided with enlarged diameter ends 50. Ends 50 each have a gasket or seal 17 (of a diameter slightly larger than ends 50) so that when carrier 18 is traveling through carrier tube 16 air leakage past carrier 18 is prevented.

FIG. 6A illustrates sub-carrier 30 which comprises a cylinder open at both ends for receiving carrier 18. A substantially rectangular plane 52 attached to the cylinder is provided with a foot 54 at each end that extends downwardly and acts to stabilize sub-carrier 30 during vertical movement inside remote terminal 14. Also attached to frame 52 are rectangular plate 56 and bar 58. Rectangular plate 56 effects air flow to cause proper operation of door 32 and will be more fully explained below. Bar 58 is positioned to operate in conjunction with latching arm 34.

Figure 8:
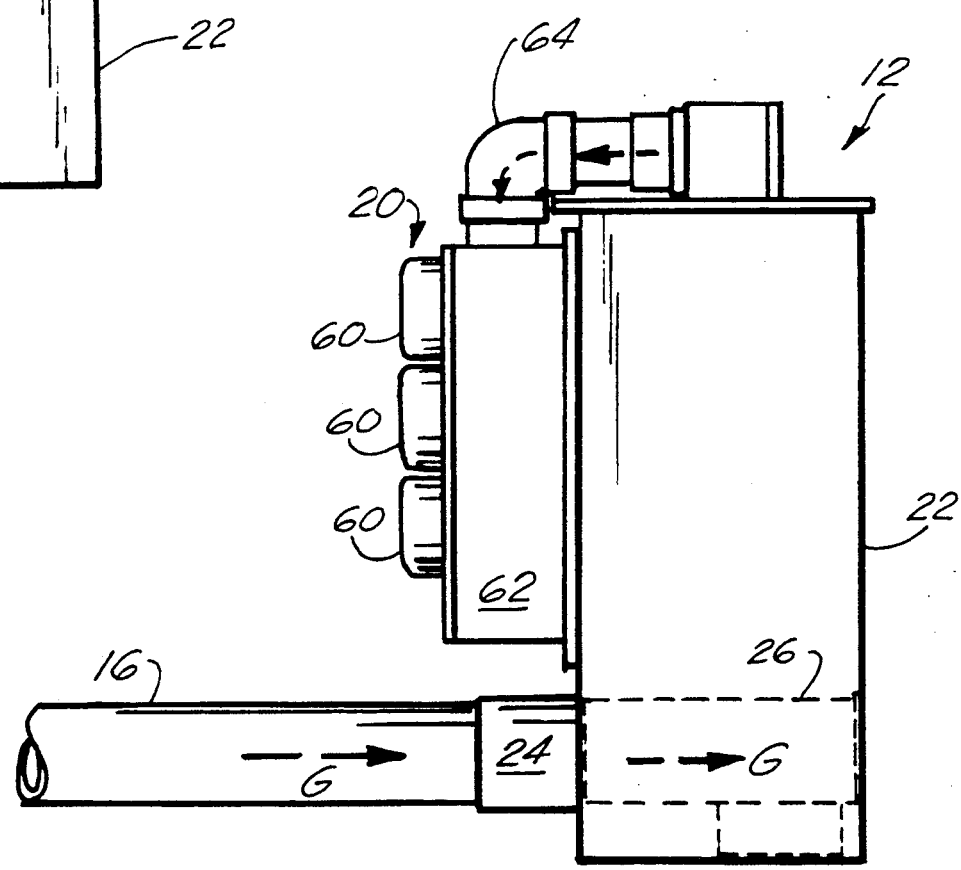
FIG. 8 is a side view of the main terminal illustrating operation in receiving the carrier at the lowered end.

Means 20 for causing carrier 18 to move between terminals 12, 14 is comprised of motors 60, housing 62, and duct 64 as best seen is FIGS. 8-10. Three motors 60 are used in the preferred embodiment. Motors 60 are reversible motors that are used to created pressure or suction in duct 64. Motors 60 are mounted in housing 62, which acts as a chamber for creating suction or pressure in conjunction with motors 60. Housing 62 is mounted on enclosure 22 of main terminal 12 and receives elbow duct 64 at its upper end. Duct 64 is in communication with the interior of enclosure 22 at the top main terminal 12. Duct 64 is provided with means 66, 67 for locking sub-carrier 26 in position at the upper end of main terminal 12 in the form of flapper 66 having angled end 67. Flapper 66 is drawn (ARROW E) toward a near vertical orientation as seen in FIG. 10 upon creation of suction by motor 60. This movement of flapper 66 also moves angled end 67 in the direction of ARROW E and angled end 67 thus acts in conjunction with a latching means or aperture (not shown) (similar to the apertures 31 of sub-carrier 30 illustrated in FIG. 6A) on the upper end of sub-carrier 26 by hooking the top of sub-carrier 26 through this grid of apertures, as best seen in FIG. 10 to retain sub-carrier 26 in the upper portion of enclosure 22 of main terminal 12. Upon creation of (positive) pressure in duct 64 against flapper 66 by motors 60, flapper 66 pivots upward (opposite ARROW E) and releases sub-carrier 26. As seen in phantom view in FIG. 10, sub-carrier 26 is of substantially the same structure as sub-carrier 30. Control panel 68 is connected to motors 60 via wires 70 and is provided with switches 72 for operating the system.

As best seen in FIGS. 3 and 4, remote terminal 14 is arranged for operation by placing sub-carrier 30 therein and tray 42 on the top of walls 46. The top is then attached as seen in FIG. 5. Main terminal 12 is set up in a similar fashion and carrier 18 is positioned inside sub-carrier 26. (Carrier 18 may be positioned inside either sub-carrier 26, 30 to complete set up.) In operation, as seen in FIG. 3, sub-carrier 30 with carrier 18 therein are held in position at the upper end of remote terminal 14 by latching arm 34 being in slot 39 adjacent door 32. An operator at main terminal 12 presses one of switches 72 to activate motor 60 and cause suction, or negative pressure, inside duct 64, enclosure 22 of main terminal 12, carrier tube 16, and enclosure 28 of remote terminal 14. Carrier tube 16 may be formed from any suitable material such as PVC pipe. As indicated by ARROW F in FIG. 4, the suction created inside remote terminal 14 and flowing between plate 56 of sub-carrier 30 and open door 32 causes door 32 to close. This moves latching arm 34 away from engagement under bar 58 and allows sub-carrier 30 and carrier 18 to fall under force of gravity to the lower end of remote terminal 14 as seen in FIG. 5. The suction then pulls carrier 18 out of sub-carrier 30 into and through carrier tube 16 into sub-carrier 26 at the lower end of main terminal 12 as indicated by ARROWS G in FIGS. 5 and 8. Sub-carrier 26 and carrier 18 are then pulled to the top of main terminal 12 by the suction as indicated by ARROWS H in FIG. 10. Hook 67 or end of flapper 66 then engages with latching means or aperture 31 on the top of sub-carrier 26 to retain it in position after motors 60 are shut off. The contents of carrier 18 are then easily removed via port 74 in enclosure 22 of main terminal 12. Carrier 18 is returned to remote terminal 14 in the following manner. The operator presses the proper switch 72 to activate motor 60 to create positive pressure in housing 62, duct 64 and enclosure 22 of main terminal 12. The pressure causes hook 67 of flapper 66 to disengage from sub-carrier 26. Sub-carrier 26 moves under the force of gravity (and the positive pressure) to the lower end of main terminal 12. Carrier 18 is then forced out of sub-carrier 26 through carrier tube 16 into sub-carrier 30. Enlarged ends 50 of carrier 18 have gaskets or seals 17 which act as a means to seal off sub-carrier 30 and enclosure 28. This diverts the positive pressure in carrier tube 16 under sub-carrier 30 (best seen in FIG. 5 by ARROW J) into isolated compartment 59. The pressure in compartment 59 forces sub-carrier 30 to the upper end of remote terminal 14 and then causes door 32 to swing open and latching arm 34 to swing under bar 58. This retains sub-carrier 30 in the upper position. Tray 42 rests on top of sub-carrier 30. Items may then be easily placed inside carrier 18 by opening door 40 of remote terminal 14.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. An pneumatic transport apparatus comprising:
   (a) a main terminal;
   (b) a remote terminal;
   (c) a carrier tube connected at one end to said main terminal and at the opposite end to said remote terminal;
   (d) a carrier movable between said main and remote terminals via said tube;
   (e) means mounted on said main terminal for causing said carrier to move between said terminals;
   (f) a first sub-carrier for accepting said carrier, said first sub-carrier being slidably movable in said main terminal for vertical movement therein;
   (g) a second sub-carrier for accepting said carrier, said second sub-carrier being slidably movable in said remote terminal for vertical movement therein; and,
   (h) means for locking said second sub-carrier in position at the upper end of said remote terminal comprising:
      (i) a door pivotally mounted on one side of said remote terminal;
      (ii) a latching arm attached to said door; and,
      (iii) an aperture provided in said side of said remote terminal for accepting said latching arm upon pivotal movement of said door.

2. The apparatus of claim 1, wherein said terminals are formed from upright hollow enclosures.

3. The apparatus of claim 1, wherein said means for causing said carrier to move between said terminals comprises:
   (a) a housing mounted on said main terminal;
   (b) a reversible motor mounted on said housing for selectively creating pressure or suction within said housing; and,
   (c) a duct in communication with said housing and said main terminal.

4. A pneumatic transport apparatus comprising:
   (a) a main terminal;
   (b) a first sub-carrier slidably received in said main terminal for vertical movement therein;
   (c) a remote terminal;
   (d) a second sub-carrier slidably received in said remote terminal for vertical movement therein;
   (e) a carrier tube connected at one end to said main terminal and at the opposite end to said remote terminal;
   (f) a carrier movable between said main and remote terminals via said tube and adapted for acceptance within said first and second sub-carriers;
   (g) means mounted on said main terminal for causing said carrier to move between said terminals and said first and second sub-carriers to move within said terminals; and,
   (h) means for locking said second sub-carrier in position at the upper end of said remote terminal comprising:
      (i) a door pivotally mounted on one side of said remote terminal;
      (ii) a latching arm attached to said door; and,
      (iii) an aperture provided in said side of said remote terminal for accepting said latching arm upon pivotal movement of said door.

5. The apparatus of claim 4, wherein said terminals are formed from upright hollow enclosures.

* * * * *